(12) United States Patent
Flory

(10) Patent No.: US 6,681,572 B2
(45) Date of Patent: Jan. 27, 2004

(54) WAVE POWER MACHINE

(76) Inventor: Edward Flory, 21416 - 52nd Ave. W. #B-8, Mount Lake Terrace, WA (US) 98043

( * ) Notice: Subject to any disclaimer, the term of this patent is extended or adjusted under 35 U.S.C. 154(b) by 105 days.

(21) Appl. No.: 09/998,853

(22) Filed: Nov. 15, 2001

(65) Prior Publication Data

US 2003/0091393 A1 May 15, 2003

(51) Int. Cl.⁷ .................................. F03C 1/00
(52) U.S. Cl. ............................. 60/507; 60/497
(58) Field of Search ................ 60/495, 497, 507

(56) References Cited

U.S. PATENT DOCUMENTS

| | | | | |
|---|---|---|---|---|
| 559,969 A | * | 5/1896 | Delmonte | 60/507 |
| 583,689 A | * | 6/1897 | McDonald | 60/507 |
| 884,080 A | * | 4/1908 | Fallis | 60/507 |
| 4,184,335 A | * | 1/1980 | Byrne | 211/70.6 |
| 4,389,843 A | * | 6/1983 | Lamberti | 60/507 |
| 4,392,060 A | * | 7/1983 | Ivy | 290/53 |
| 4,541,242 A | * | 9/1985 | Thompson, Jr. | 60/506 |
| 5,461,863 A | * | 10/1995 | Simonds | 60/676 |

* cited by examiner

*Primary Examiner*—Hoang Nguyen
(74) *Attorney, Agent, or Firm*—David L. Tingey

(57) ABSTRACT

A pair of articulated rods connect between a float and a pair of shafts through a one-way clutch on the respectively shafts. When a float rises an "up" connecting rod causes the "up" shaft to rotate as its clutch is engaged, and when the float falls, that clutch disengages, allowing that shaft to freewheel. Likewise when the float falls a "down" connecting rod causes the "down" clutch to engage and the "down" shaft to rotate, typically rotating opposite the rotation of the "up" shaft. When the float reverses and begins to rise again, the "down" clutch disengages and the "up" clutch reengages. A connecting rod hand member connected pivotably to the forearm at a wrist joint is adjustable in length. The wrist joint adjusts the effective length of the hand member to change the stroke of the machine to match wave amplitude through a computer-controlled pneumatic actuator. A plurality of floats with their attendant connecting rods and clutches typically are connected in series along the two shafts out of phase to track a passing wave such that the shafts continually rotate through input of one or more rising and falling floats.

11 Claims, 5 Drawing Sheets

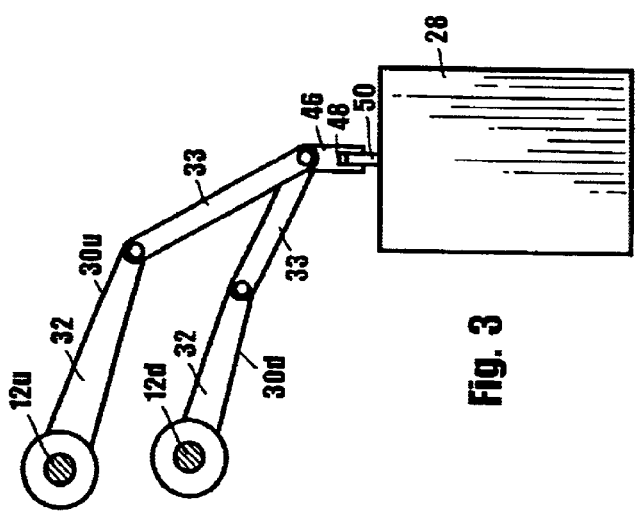
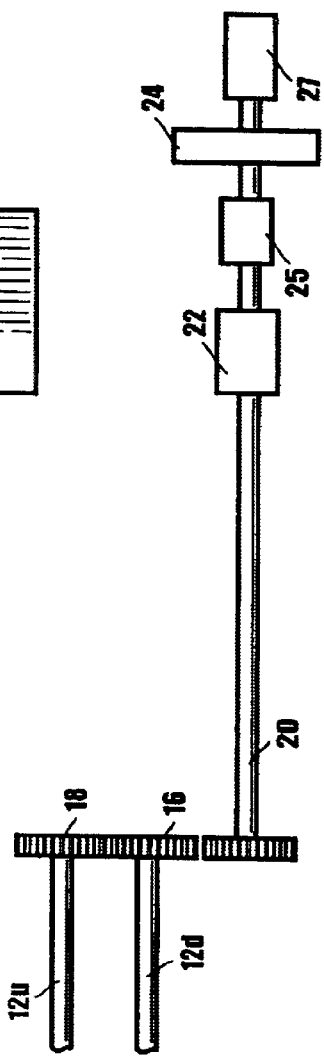

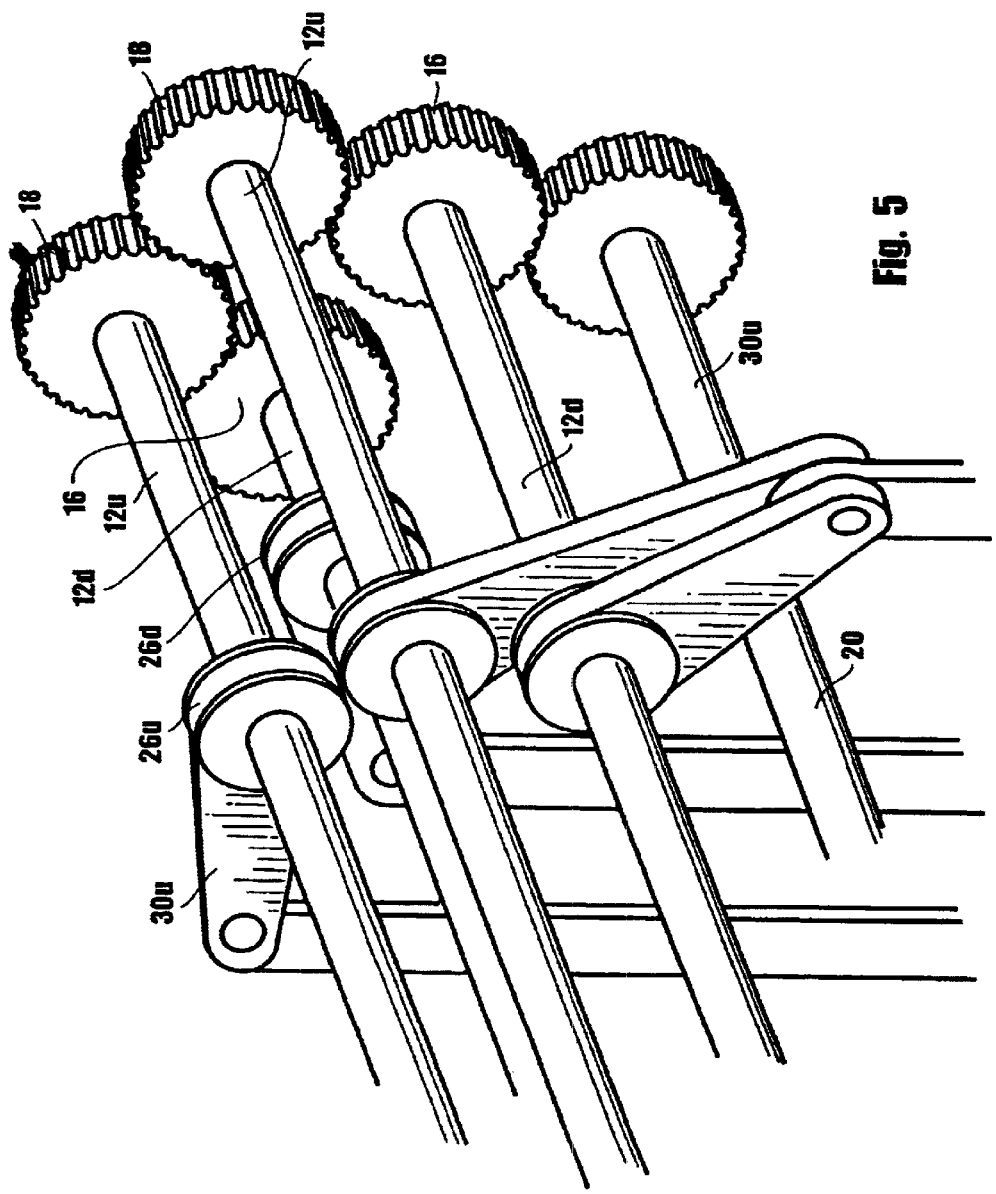

WAVE POWER MACHINE

FIELD OF THE INVENTION

This invention pertains machines that extract energy from ocean wave motion, and more specifically, to a wave motion machine that is mountable on a pier or large ocean vessel and continuously rotates a drive shaft to which a generator is attached.

BACKGROUND OF THE INVENTION

Various devices have been disclosed for harnessing energy within ocean waves. Typically, a shaft is rotated when a float riding on a wave lifts a crankshaft, resting as the wave subsides until another wave again lifts the float. Thus, only half of the wave motion is captured. It is also typical that past wave motion machines require a limited range of wave amplitude to complete a rotation of a crankshaft, being nonfunctional with waves too small to complete a crankshaft rotation and perhaps disabling the machine when waves larger than anticipated overwhelm the machine.

SUMMARY OF THE INVENTION

The primary object of the invention is to continuously harness electrical energy from ocean wave motion using a machine operating from a stationary platform, such as a pier or a large sea-going vessel, under which ocean waves pass. It is also an object that the device operate on a large range of ocean wave amplitudes, adjusting to accommodate changes in wave amplitude. It is also an object that the machine extract wave energy both on the wave amplitude rise and on the wave amplitude fall. It is a further object that the device accumulate energy as necessary to enable energy to be continuously drawn from the device while a variable amount of energy is extracted from wave action.

These objects are achieved in a highly efficient wave machine that produces continuous power efficiently and economically. The machine easily operates from a pier or large ocean-going vessel with floats that ride on the surface of the water and drive a rotating shaft. The shaft then drives a generator to provide continuous electricity to an island cabin or well water pump, for example, or serve as an emergency back-up electricity supply. A plurality of gears is fixed to the shaft axially such that motion of the shaft causes the gears to rotate.

A plurality of floats intended to be positioned in a body of water are mechanically connected to a one-way clutch or ratchet on the shaft so that when the floats rise and fall as waves pass beneath them, the shaft rotates. (For descriptive purposes herein, we will use one-way clutch to represent all such one-directional drive means.) A pair of articulated connecting rods are connected to each float with one of the rods connected to a first shaft and the other connected to a second shaft, each connecting rod attached to a one-way clutch on the respectively shafts. When the float rises, the rod forearm member attached to the float on one end and pivotably to the rod upper arm member on its other end pushes the rod upper arm member up as its pivot connection elbows, rotating the rod upper arm member which is firmly connected to the one-way clutch. The rotating rod upper arm member thus causes the engaged clutch to rotate. The connecting rod pivot connection also unfolds to allow the float to rise above that connection to accommodate very large waves.

Thus, when a float rises the "up" connecting rod causes the "up" shaft to rotate as its clutch is engaged, however, when the float falls, that clutch disengages, allowing that shaft to freewheel. Likewise when the float falls the "down" connecting rod causes the "down" clutch to engage and the "down" shaft to rotate, typically rotating opposite the rotation of the "up" shaft. When the float reverses and begins to rise again, the "down" clutch disengages and the "up" clutch reengages. Thus, the wave does not need to lift the float a given height such as to cause a crank on the drive shaft to rotate around the shaft in order to impart energy to the shaft. Virtually any movement is captured by the one-way clutch and transfers that movement into rotational energy in the drive shaft. When the float falls before it reaches a machine shaft rotational apex, that clutch simply disengages and its complementary one-way clutch engages to capture the downward motion of the float, regardless of how high the float rose.

A connecting rod hand member may also be connected pivotably to the forearm at a wrist joint, and at that wrist joint the hand member, adjustable in length at the wrist joint to reach from the pier to an average water level, releases from the wrist joint if the float should rise to a level even above the unfolded arm length. Thus, if the wave were to be very large such that the float rises above the extent of the unfolded rod upper arm member, the float simply floats away from the machine on the pier. The float remains tethered to the arm to avoid loss of the floats. Energy is not captured in this unlikely event at this portion of the float movement, but the machine also is not damaged because the float is not constrained to ride on a given vertical path along the pier or within an artificial limitation of wave movement.

A plurality of floats with their attendant connecting rods and clutches typically are connected in series along the two shafts. In operation, as a wave passes under the series of floats, a first float will rise followed by a subsequent float so that the floats are out of phase. As each float is connected to the shafts, the shafts continue to rotate under the force of the rising and falling floats, each at a different phase. As one float is beginning to rise, another may be ending its rise and another may be midway down its fall, for example. Ideally, the number, size and spacing of the floats is such that a wave continues to exert force on at least one of the shafts at all times, therein providing continuous energy to the machine.

Typically, one or more drive gears mechanically link the two shafts with meshing gear teeth. An output shaft also mechanically links to the gears, commonly with an output gear with teeth meshing with one of the drive gears.

The output shaft is connected to a transmission to regulate and optimally drive a flywheel that is used to moderate and store extracted energy. An output one-way clutch is also connected between the transmission and the flywheel to disconnect the flywheel when the output shaft is not adding to rotation of the flywheel. A generator or other energy-consuming device is connected after the flywheel.

BRIEF DESCRIPTION OF THE DRAWINGS

FIG. 3 is a end view of a shaft and one-way clutch with a connecting arm and float attached.

FIG. 4 is a side view of drive gears connected to an output gear and shaft driving a transmission, one-way clutch, flywheel and generator.

FIG. 5 is a perspective view of left and right, up and down drive shafts all mechanically linked via drive gears to an output gear and transmission, the drive gears shown with intermeshing gear teeth with the output gear teeth meshing with one of the drive gears.

DETAILED DESCRIPTION OF THE INVENTION

Figure 1:
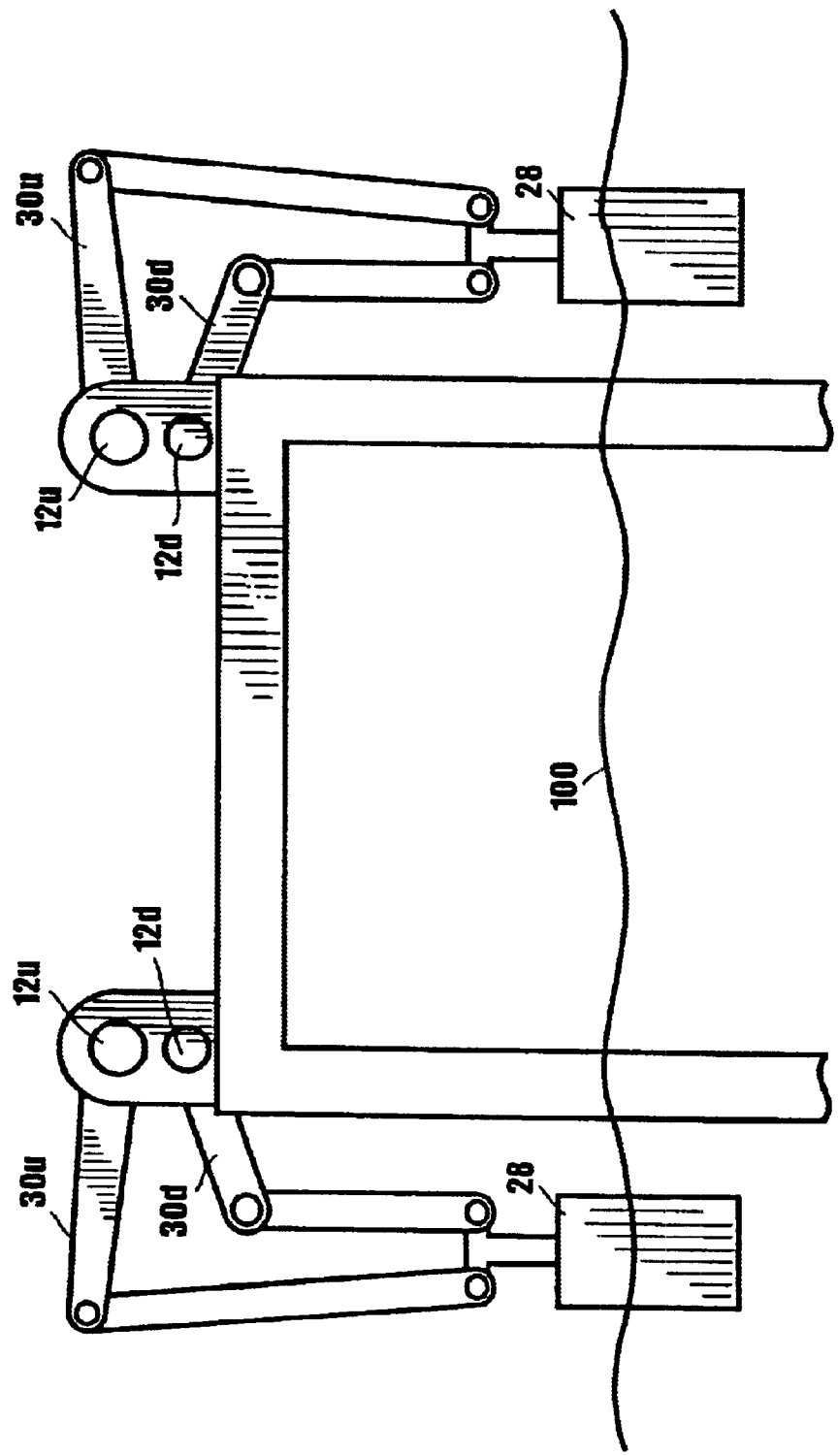
FIG. 1 is an end view of the machine of the present invention mounted on each side of a pier.
Figure 2:
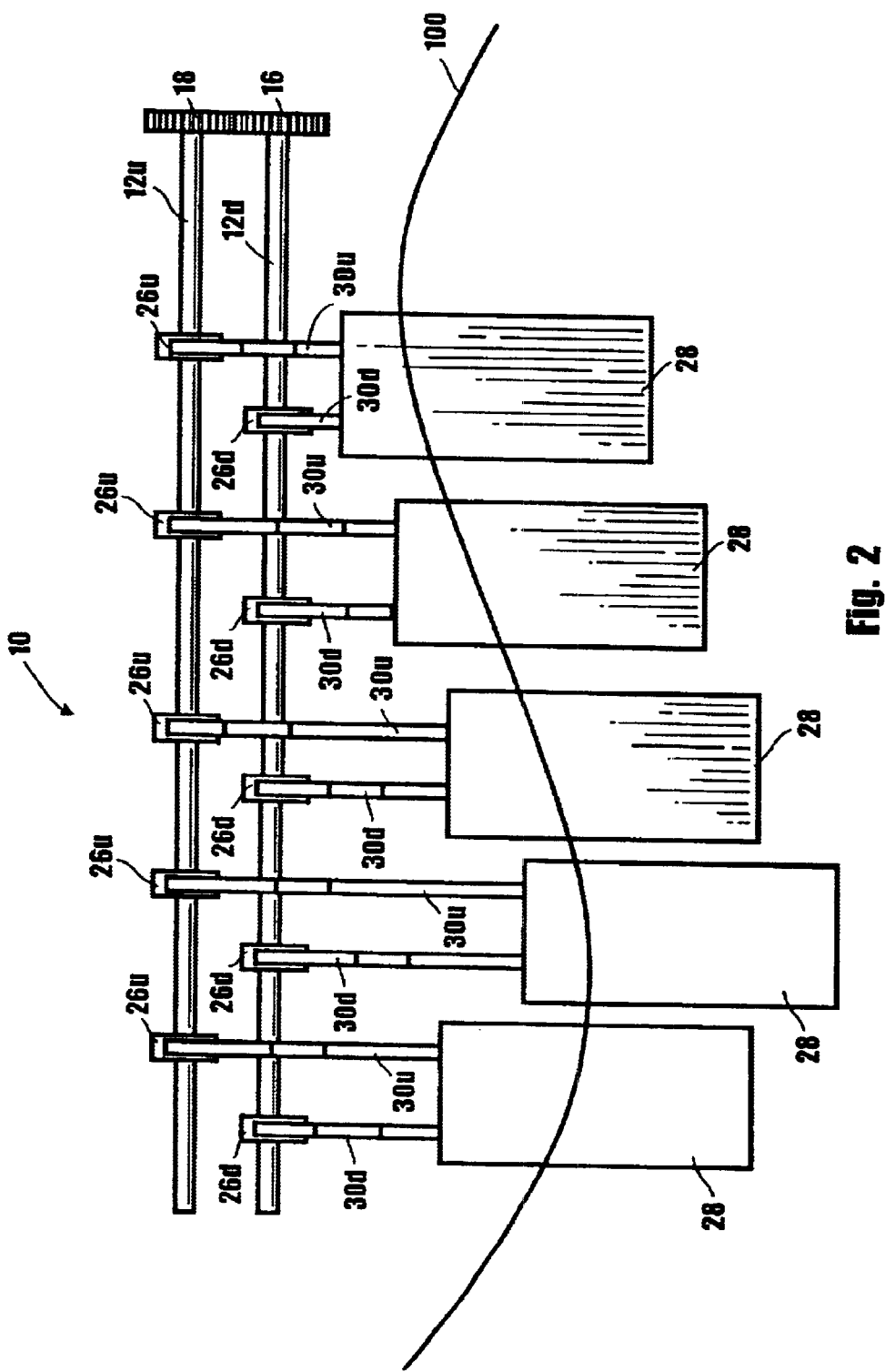
FIG. 2 is a side view of several units, each unit comprising a float and attendant connecting rods, connected in series to a common "up" shaft and a "down" shaft.
Figure 6:
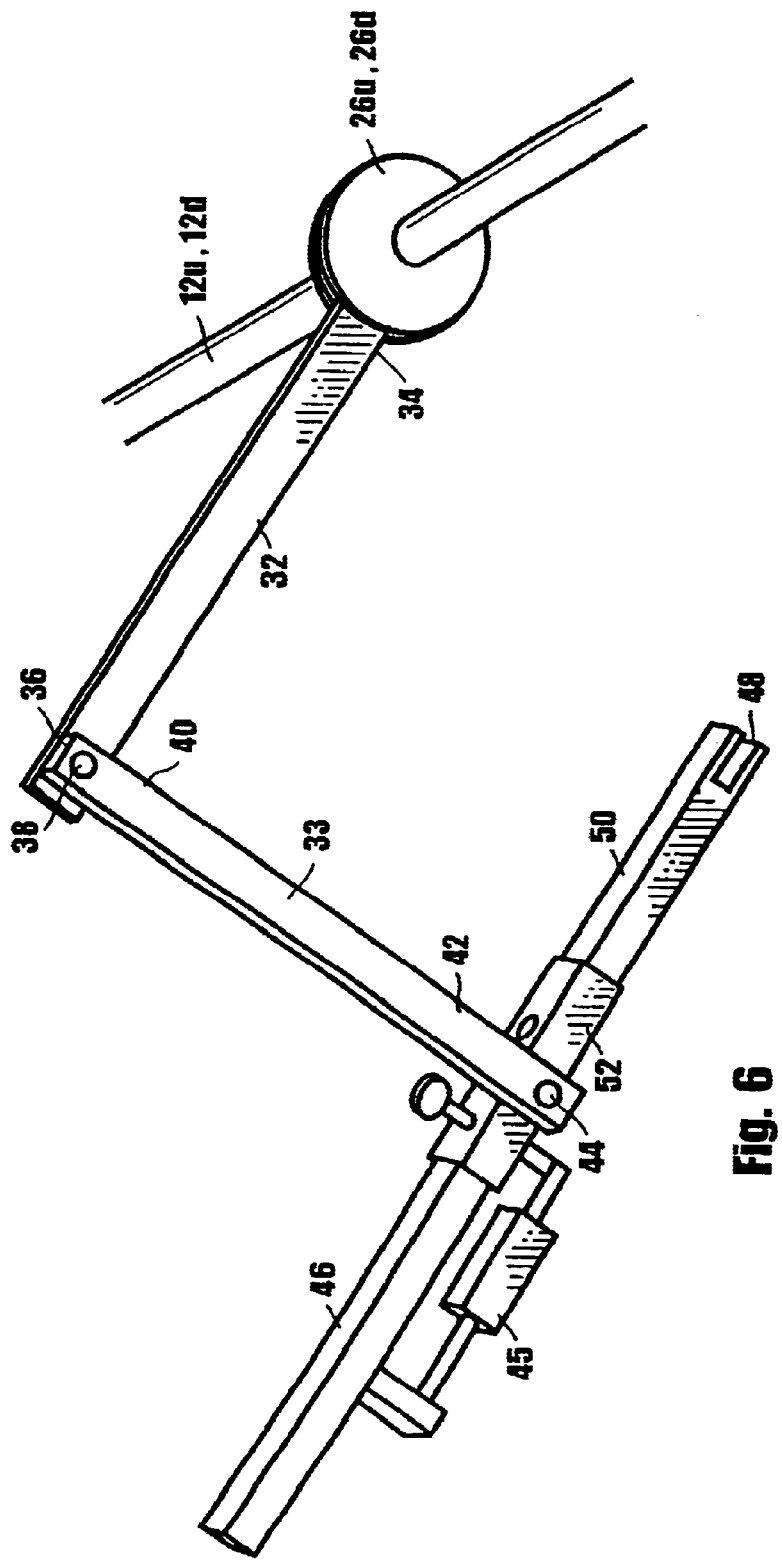
FIG. 6 is a perspective view of adjustable articulated connecting arms.

The wave machine of the present invention comprises one or more power units 10 connected serially in the direction of wave motion. Each unit 10 is connected to a pair of counter rotating shafts, an up drive shaft 12$u$ and a down drive shaft 12$d$, mechanically connected axially to up and down drive gears 16 and 18 respectively, the drive gears also mechanically linked and further connected mechanically to an output shaft 20. The output shaft 20 drives a transmission 22 that is connected to a flywheel 24 through a output shaft one-way clutch 25. A generator 27 or other consuming device is connected to the flywheel 24. Each unit 10 is connected to the up and down drive shafts 12$u$ and 12$d$ through an up one-way clutch 26$u$ and a down one-way clutch 26$d$ on those drive shafts respectively.

Each unit 10 includes a float 28, the aforesaid up one-way clutch 26$u$, the aforesaid down one-way clutch 26$d$, an up connecting rod 30$u$ connected between the float 28 and the up one-way clutch 26$u$. Similarly, a down connecting rod 30$d$ connects between the float 28 and the down one-way clutch 26$d$. As a wave 100 passes under the series of floats 28, each unit 10 contributes to the rotation of the drive shafts 12$u$ and 12$d$ at a phase different from another unit. Up motion of the up connecting rod 30$u$ causes the up drive shaft 12$u$ to at least partially rotate and down motion of the down connecting rod 30$d$ causes the down drive shaft 12$d$ to at least partially rotate.

Each connecting rod 30$u$ and 30$d$ is articulated with a upper member 32 connected on one end 34 to one of said up or down one-way clutches 26$u$ and 26$d$. Its other end 36 is connected pivotably at an elbow connection 38 to a first end 40 of a forearm member 33 with a forearm second end 42 connected pivotably at a wrist joint 44 to a hand member 46 also connected to the float 28. Thus, the articulated connecting rod 30$u$ and 30$d$ allows the float 28 to rise and fall as a wave passes under it while converting the vertical float movement to rotational drive shaft movement through the one-way clutch. Even a relatively small wave is sufficient to cause a partial drive shaft rotation, which with similar contributions to rotation from other floats acting in another degree of phase, imparts full and, ideally, continuous rotation to the drive shaft.

To accommodate large waves, that is waves causing the float to rise to a point beyond which it contributes to rotation of the drive shaft, the articulated connecting rod 30$u$ and 30$d$ unfolds and tracks the float 28 upward above the drive shaft 12$u$ and 12$d$. In such instance as the float might rise to a rod limit, that is, beyond the extent of the connecting rod even directing generally upward, the hand member connected to the float is adapted to release from the forearm member through a releasable wrist joint 44. The hand member 46 may have a slot 48 in the forearm end 42 into which a bar 50 on the float 28 slidably fits, held in the slot by the upward bias of the float and a release mechanism such as a detent (not shown) that holds the hand in the joint during normal fall of the float on a wave, requiring only retention force equal to minor resistance in the articulated arm and clutch, but releases under upward force of a large wave above the rod limit. The hand 46 may be tethered to the wrist joint to retain the float nearby upon its release.

The wrist joint 44 is adjustable with the hand member 46 slidably secured in the wrist joint 44 in a wrist bracket 52. Thus adjustable the stroke of the machine is adjustable to match wave amplitude. A pneumatic actuator 45 between the hand member 46 and the wrist joint 44 is employed to effect the adjustment during operation. A computer (not shown) controls the adjustment of the actuator 45 as a function of wave amplitude, measured by the rotation of the drive shafts 12$u$ and 12$d$ for each wave cycle and digitally fed to the computer for processing. This hand member adjustment in length also allows the articulated connecting rod to adjust to an operative distance between the drive shaft on the pier and an effective ocean water level.

Clearly, a second set of units also connected serially along up and down shafts can be connected in parallel to a first set forming a left and right set. In this case, four drive shafts comprising left up and down shafts and right up and down shafts and are mechanically linked through respective up and down drive gears and to a common output shaft 20.

Having described the invention, what is claimed is as follows:

1. A wave machine comprising
   a first power unit including
      a float,
      an up one-way clutch,
      a down one-way clutch,
      an up connecting rod connected between the float and the up one-way clutch,
      a down connecting rod connected between the float and the down one-way clutch with down motion of the down connecting rod causing the down clutch to at least partially rotate, the float adapted to float in water laterally and vertically unconstrained except parallel to the drive shafts by attachment of the connecting rods to the float,
      an up drive gear,
      an up drive shaft connected axially to the up drive gear with the up one-way clutch connected to the drive shaft, up motion of the up connecting rod causing the up drive shaft to at least partially rotate,
      a down drive gear engaging the up drive gear,
      a down shaft connected axially to the down drive gear with the down one-way clutch connected to the down shaft down motion of the down connecting rod causing the down drive shaft to at least partially rotate,
      the up drive gear and down drive gear mechanically connected to a power consuming means
      wherein each of said up and down connecting rods comprises an articulated upper arm with one end connected to the drive one-way clutch and another end pivotably connected at an elbow joint to one end of a forearm member with a forearm other end pivotably connected at a wrist joint to one end of a hand member with another end of the hand member connected to the float.

2. The wave machine of claim 1 wherein the wrist joint comprises a bracket in which a hand member is adjustable secured in length effecting a preferred connecting rod length.

3. The wave machine of claim 1 wherein the wrist joint conditionally releases the hand member upon effective outward pull while securing the hand member in the wrist joint with the float below the drive shaft and supported by ocean water.

4. The wave machine of claim 1 further comprising a plurality of power units similar to the first power unit, each with an up one-way clutch and a down one-way clutch connected respectively along the up shaft and down drive shafts such that the float of each unit rises and falls out of phase with adjacent floats therein compelling the shafts to rotate as a wave passes under the floats in succession, each unit contributing to the rotation of the shafts at phase different from another unit.

5. The wave machine of claim 1 wherein the power consuming means comprises an output gear mechanically connected to the up connecting gear and the down connecting gear, an electricity generator connected to the drive gear.

6. The wave machine of claim 1 wherein the power consuming means comprises an output gear mechanically connected the up connecting gear and the down connecting gear, a flywheel connected to the drive gear.

7. The wave machine of claim 1 wherein the power consuming means comprises an output gear engaging at least one of the up connecting gear and down connecting gear, a drive one-way clutch connected to the drive gear.

8. The wave machine of claim 1 wherein the power consuming means comprises a transmission connected to the drive gear.

9. The wave machine of claim 1 further comprising a second power unit parallel the first power unit, the second power unit similarly including a second float, a second up one-way clutch, a second down one-way clutch, a second up connecting rod connected between the second float and the second up one-way clutch, a second down connecting rod connected between the second float and the second down one-way clutch, the float adapted to float in water laterally and vertically unconstrained except parallel to the drive shafts by attachment of the connecting rods to the float, a second up drive gear, a second up shaft connected axially to the second up drive gear with the second up one-way clutch connected thereto with up motion of the up connecting rod causing the second up drive gear to at least partially rotate, a second down connecting gear mechanically connected to the second up connecting gear, a second down shaft connected axially to the second down drive gear with the second down one-way clutch connected thereto, the down motion of the down connecting rod causing the second down drive gear to at least partially rotate, an output gear mechanically connected to the up drive gear and the down drive gear and the second up drive gear and second down drive gear, a power consuming means to which the drive gear is connected.

10. A wave machine comprising a plurality of power extraction units each including
a float,
a up one-way clutch,
a down one-way clutch,
a up one-way clutch connecting rod connected between the float and the up one-way clutch,
a down one-way clutch connecting rod connected between the float and the down one-way clutch with down motion of the connecting rod causing the down one-way clutch to partially rotate, the float adapted to float in water laterally and vertically unconstrained except parallel to the drive shafts by attachment of the connecting rods to the float, wherein each of said up and down connecting rods comprises an articulated upper arm with one end connected to the drive one-way clutch and another end pivotably connected at an elbow joint to one end of a forearm member with a forearm other end pivotably connected at a wrist joint to one end of a hand member with another end of the hand member connected to the float, an up connecting gear, an up shaft connected axially to the up connecting gear with the up one-way clutch connected thereto with up motion of the connecting rod causing the up shaft to at least partially rotate, a down connecting gear engaging the up connecting gear, a down shaft connected axially to the down connecting gear with the down one-way clutch connected thereto with down motion of the connecting rod causing the down shaft to at least partially rotate, with each up one-way clutch and each down one-way clutch connected respectively along the up shaft and down shaft such that the float of each unit rises and falls out of phase with adjacent floats therein impelling the drive shafts to rotate as a wave passes under the floats in succession, each unit contributing to the rotation of the shafts at a phase different from another unit, an output gear mechanically connected to the up drive gear and the down drive gear, a power consuming means, a transmission connected between the power consuming means and the output gear, a drive one-way clutch connected between the power consuming means and the output gear, a flywheel connected between the power consuming means and the output gear, a electricity generator connected to the output gear.

11. The wave machine of claim 10 further comprising a second power extraction unit parallel the first power extraction unit a second up connecting gear, a second up shaft with the second up one-way clutch connected thereto causing it to rotate and itself connected axially to the second up connecting gear, a second down connecting gear engaging the second up connecting gear, a second down shaft with the second down one-way clutch connected thereto causing it to rotate and itself connected axially to the second down connecting gear, a drive gear engaging at least one of the up connecting gear and down connecting gear and at least one of the second up connecting gear and second down connecting gear, a power consuming means to which the drive gear is connected.

* * * * *